June 2, 1931.　　　　G. CATTANEO　　　　1,807,830
LUBRICANT PURIFIER FOR CONNECTING ROD BEARINGS
Filed March 22, 1928
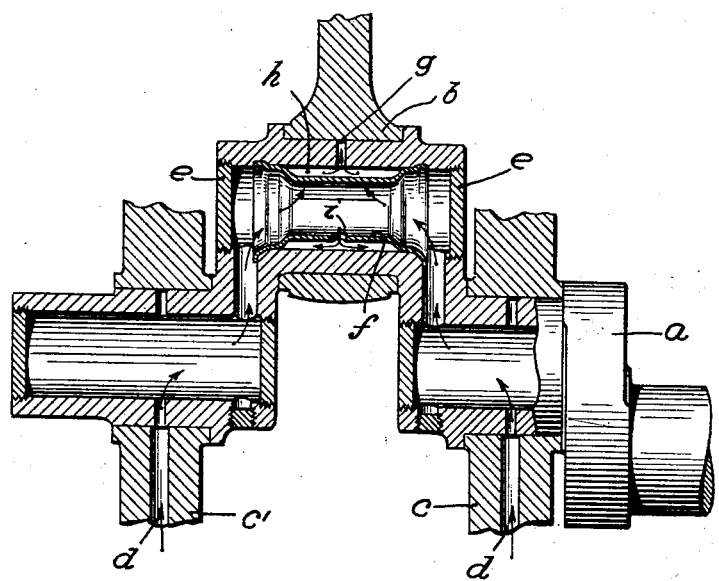
INVENTOR
GIUSTINO CATTANEO
BY George L. Sath
ATTORNEY Patented June 2, 1931

1,807,830

UNITED STATES PATENT OFFICE

GIUSTINO CATTANEO, OF MILAN, ITALY

LUBRICANT PURIFIER FOR CONNECTING ROD BEARINGS

Application filed March 22, 1928, Serial No. 263,835, and in Italy May 17, 1927.

For the lubrication of a bearing it is necessary to maintain, under all working conditions, an uninterrupted film of lubricant between the surface of the shaft or pin concerned and the bearing surface so as to prevent all contact between the said surfaces, the amount of lubricant supplied being sufficient to replace the lubricant that escapes from the bearing and to absorb and partially carry off the heat generated during the running of the machine.

It is obvious that, if the lubricant were continually renewed, the life of the shaft or pin and of the bearing would be nearly indefinite. In actual practice, from economical reasons, a certain constant amount of lubricant is continually circulated and passed through a filter (generally consisting of a wire gauze) before it is passed through the circulation pump. Now, the meshes of the wire gauze cannot be so fine as to retain even the smallest impurities; in practice, these smaller particles are those that are present in greater quantities and since they remain in suspension in the lubricant, more readily pass on into the bearings.

These impurities, consisting of hard particles with high abrasive action, are entrained by the lubricant between the running surfaces, where they become wedged in the bearing metal; as the bearing metal is generally softer than the metal of which the shaft or pin is made, the said small impurities strip off minute metal particles like tiny grinding tools and are thus the source of rapid wearing. It is therefore of high importance to remove these impurities to the largest practicable extent, in order to secure a long life of the bearings.

Among the various methods for epurating liquids in which impurities are contained, the centrifugation method has proved the best one. As well known, this method is based on the different centrifugal force generated in the liquid on one side and in the impurities on the other side when a quick rotating movement is imparted to the mass of this liquid.

The present invention relates to a novel arrangement for the application of this system, this arrangement exhibiting the advantage of a great simplicity and of the absence of any moving parts.

The accompanying drawing is intended to show the working of the novel arrangement and illustrates by way of example one of the forms in which it can be carried into practice.

—$a$— is the crankshaft, —$b$— the hollow crank pin of one of the connecting rods, —$c$— and —$c'$— are two crankshaft bearings, one on one side and the other on the opposite side of the crank taken into consideration.

The crankshaft is hollow to let the lubricant pass; the lubricating oil enters in the direction indicated by the arrows —$d$— and passes on into the hollow crank pin —$b$—, mainly under the action of the centrifugal force set up by the rotation of the crankshaft.

The ends of the bore of pin —$b$— are closed by plugs —$e$—; inside of said bore is lodged a sleeve —$f$— the center portion of which is smaller in diameter than the said bore, and the enlarged portions thereof abut said bore so that an annular space —$h$— is left free between the bore and the sleeve.

The lubricating oil supplied, as above stated, through the holes —$d$—, enters the inside space of the sleeve —$f$— by centrifugal force and fill it; from this space the oil can get into the annular space —$h$— only through the hole —$i$— lying in the plane that passes through the axis of the crankshaft and through the axis of the pin —$b$— at the point which is nearest the axis of the crankshaft.

It is obvious that, with a definite speed of the crankshaft rotation, the lubricating oil filling the sleeve —$f$— is subjected to a centrifugal force directly proportional to the rotation radius of each point of the oil mass, the centrifugal force being greater according as the points are farther away from the rotation axis. Further, the centrifugal force is directly proportional to the mass of the bodies concerned, and consequently the impurities possessing a greater specific weight than the oil will be projected toward the sleeve wall lying farthest away; there said impurities will be retained and will be prevented from passing through the hole —*i*— into the annular space —*h*— and from getting, through the hole —*g*—, at the bearing surface. The bearing accordingly receives only lubricating oil that has been freed from the particles of greater density it held in suspension.

Having now particularly described and ascertained the nature of my said invention and in what manner the same is to be performed, I declare that what I claim is:

A device for centrifugal epuration of lubricant in internal combustion engines, comprising a hollow crankshaft having a hollow crank pin provided with a hole remote from the axis of said hollow crank shaft, a cylindrical sleeve in internal annular spaced relation within said crank pin having enlarged ends communicating directly with the interior of crank shaft and abutting said crank pin, said sleeve being provided with a second hole diametrically opposite said first mentioned hole in said crank pin.

Signed at Milan (Italy), this 25th day of Feb., 1928.

GIUSTINO CATTANEO.